United States Patent
Hwang et al.

(10) Patent No.: US 12,535,631 B2
(45) Date of Patent: Jan. 27, 2026

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Seon Oh Hwang, Suwon-si (KR); Yeon Ju Jung, Suwon-si (KR); Seo Young Kang, Suwon-si (KR); Kwang Ho Shin, Suwon-si (KR); Jong Kyu Choi, Suwon-si (KR); Il Woong Baek, Suwon-si (KR); Bong Choon Kim, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 566 days.

(21) Appl. No.: 17/834,789

(22) Filed: Jun. 7, 2022

(65) Prior Publication Data

US 2022/0397715 A1    Dec. 15, 2022

(30) Foreign Application Priority Data

Jun. 10, 2021    (KR) .................. 10-2021-0075457

(51) Int. Cl.
- *G02B 5/30* (2006.01)
- *G02B 1/111* (2015.01)
- *G02B 1/14* (2015.01)

(52) U.S. Cl.
CPC ............ *G02B 5/3083* (2013.01); *G02B 1/111* (2013.01); *G02B 1/14* (2015.01); *G02B 5/305* (2013.01)

(58) Field of Classification Search
CPC .... G02B 5/3083; G02B 5/305; G02B 5/3033; G02B 5/3041; G02B 5/0294; G02B 5/30;
(Continued)

(56) References Cited

U.S. PATENT DOCUMENTS

| | | | |
|---|---|---|---|
| 2004/0114248 A1 | 6/2004 | Hokazono et al. | |
| 2004/0127594 A1* | 7/2004 | Yang | C08F 290/061 428/423.1 |

(Continued)

FOREIGN PATENT DOCUMENTS

| | | |
|---|---|---|
| CN | 110249243 A | 9/2019 |
| KR | 10-2003-0096314 A | 12/2003 |

(Continued)

OTHER PUBLICATIONS

Taiwanese Office Action dated May 10, 2023, issued in corresponding Taiwanese Patent Application No. 111121435 (8 pages).

(Continued)

*Primary Examiner* — Derek S. Chapel
*Assistant Examiner* — Adam W Booher
(74) *Attorney, Agent, or Firm* — Ricky Lam (57) ABSTRACT

A polarizing plate and an optical display apparatus including the same are provided. A polarizing plate includes: a polarizer; an antireflection film stacked on a first surface of the polarizer; and a retardation film stacked on a second surface of the polarizer, and the antireflection film has a water vapor transmission rate of 1 $g/m^2 \cdot day$ to 30 $g/m^2 \cdot day$, and the retardation film has a water vapor transmission rate of 1 $g/m^2 \cdot day$ to 100 $g/m^2 \cdot day$.

13 Claims, 2 Drawing Sheets

(58) Field of Classification Search
CPC .......... G02B 5/3025; G02B 1/14; G02B 1/04; G02B 1/11–118; G02F 1/133528–13355; H10K 59/50; B32B 7/023; B32B 7/12
See application file for complete search history.

(56) References Cited

U.S. PATENT DOCUMENTS

| | | | |
|---|---|---|---|
| 2006/0210767 A1* | 9/2006 | Yoshitomi | G02F 1/133502 428/1.31 |
| 2016/0054499 A1 | 2/2016 | Kuroda | |
| 2018/0095211 A1* | 4/2018 | Lee | G02F 1/13363 |
| 2018/0217297 A1 | 8/2018 | Kim et al. | |
| 2019/0154884 A1* | 5/2019 | Kim | G02B 5/305 |
| 2020/0012016 A1* | 1/2020 | Heo | G02B 1/111 |
| 2021/0325590 A1* | 10/2021 | Lee | G02B 5/3083 |
| 2021/0336230 A1* | 10/2021 | Lee | H10K 59/8791 |
| 2022/0390650 A1 | 12/2022 | Kim et al. | |
| 2022/0390659 A1* | 12/2022 | Koo | H10K 59/8791 |

FOREIGN PATENT DOCUMENTS

| | | | |
|---|---|---|---|
| KR | 10-2013-0077707 A | 7/2013 | |
| KR | 10-2013-0103595 A | 9/2013 | |
| KR | 10-2015-0100843 A | 9/2015 | |
| KR | 10-2017-0082918 A | 7/2017 | |
| KR | 10-2021-0054839 A | 5/2021 | |
| TW | 201243403 A | 11/2012 | |
| TW | 201900417 A | 1/2019 | |
| TW | 202104953 A | 2/2021 | |
| WO | WO-2020091551 A1 * | 5/2020 | ......... H10K 59/8791 |

OTHER PUBLICATIONS

Korean Office Action dated Jun. 17, 2024, issued in corresponding Korean Patent Application No. 10-2021-0075457 (5 pages).

* cited by examiner

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2021-0075457, filed on Jun. 10, 2021 in the Korean Intellectual Property Office, the entire disclosure of which is incorporated herein by reference.

FIELD

Aspects of embodiments of the present invention relate to a polarizing plate and an optical display apparatus including the same.

DESCRIPTION OF THE RELATED ART

An organic light emitting diode display can suffer from deterioration in visibility and contrast due to reflection of external light. In order to solve such a problem, a polarizing plate including a polarizer and a retardation film may be used. The polarizing plate can realize an antireflection function by preventing or substantially preventing reflected external light from leaking out. Typically, a technique of adding a patterned layer to a polarizing plate to impart an antireflection effect is being developed in the art. However, addition of a separate patterned layer to the polarizing plate requires an additional process and can increase the thickness of the polarizing plate.

An antireflection function of a polarizing plate stacked on a panel can be evaluated based on reflected color sensitivity upon irradiation with external light. The antireflection function may be realized by polarization performance of a polarizer and retardation of a retardation film in the polarizing plate. Polarization performance may be imparted by the polarizer uniaxially stretched at high elongation. Thus, after the polarizer is left at high temperature and/or under high temperature/humidity conditions for a long period of time, the polarizer can suffer from deterioration in polarization performance due to shrinkage thereof. As a result, the polarizing plate may fail to suitably realize the antireflection function. Therefore, there is a need for a polarizing plate that has good reliability through suppression of variation in polarization performance of the polarizer even after the polarizing plate is left at high temperature and/or under high temperature/humidity conditions for a long period of time.

The background technique of the present invention is disclosed in Korean Patent Laid-open Publication No. 10-2013-0103595 and the like.

SUMMARY

According to an aspect of embodiments of the present invention, a polarizing plate that has improved reliability after being left at high temperature and/or under high temperature/humidity conditions for a long period of time is provided.

According to another aspect of embodiments of the present invention, a polarizing plate that includes a retardation film exhibiting positive wavelength dispersion and exhibits low reflectivity and good reflected color sensitivity when applied to a display panel is provided.

One or more aspects of the present invention relate to a polarizing plate.

According to one or more embodiments, a polarizing plate includes: a polarizer; an antireflection film stacked on a first surface of the polarizer; and a retardation film stacked on a second surface of the polarizer, wherein the antireflection film has a water vapor transmission rate of 1 $g/m^2 \cdot day$ to 30 $g/m^2 \cdot day$, and the retardation film has a water vapor transmission rate of 1 $g/m^2 \cdot day$ to 100 $g/m^2 \cdot day$.

In one or more embodiments, the retardation film may exhibit positive wavelength dispersion.

In one or more embodiments, the retardation film may have a short wavelength dispersion of 0.99 to 1.05 and a long wavelength dispersion of 0.98 to 1.04.

In one or more embodiments, the retardation film may have an in-plane retardation of 130 nm to 160 nm at a wavelength of 550 nm.

In one or more embodiments, the antireflection film may have a positive (+) reflective color value a* of 4 to 10 and a negative (−) reflective color value b* of −20 to −1.

In one or more embodiments, the antireflection film may have an in-plane retardation Re of 3,000 nm or more at a wavelength of 550 nm.

In one or more embodiments, the antireflection film may include a base layer and a low reflectivity layer stacked on the base layer.

In one or more embodiments, the low reflectivity layer may have a thickness of 110 nm to 180 nm.

In one or more embodiments, the base layer may include at least one selected from among a polyester resin and a cyclic olefin polymer resin.

In one or more embodiments, the polarizing plate may further include at least one of a hard coating layer and a high refractivity layer between the base layer and the low reflectivity layer.

In one or more embodiments, with reference to a machine direction (MD) of the polarizing plate, the polarizer may have an absorption axis tilted at an angle of −1° to +1°, the base layer in the antireflection film may have a slow axis tilted at an angle of +80° to +100°, and the retardation film may have a slow axis tilted at an angle of −137° to −133° or at an angle of −47° to −43°.

In one or more embodiments, the polarizing plate may further include a first bonding layer between the polarizer and the antireflection film, and a second bonding layer between the polarizer and the retardation film, wherein each of the first and second bonding layers may be formed of an actinic radiation-curable bonding agent.

Further, one or more aspects of the present invention relate to an optical display apparatus.

According to one or more embodiments, an optical display apparatus may include any of the above-described embodiments of a polarizing plate according to the present invention.

DETAILED DESCRIPTION

Herein, some example embodiments of the present invention will be described in further detail with reference to the accompanying drawings such that the present invention can be easily implemented by those skilled in the art. It is to be understood that the present invention may be embodied in different ways and is not limited to the following embodiments. In the drawings, components unrelated to the description may be omitted for clear description of the invention, and like components are denoted by like reference numerals throughout the specification. Although lengths, thicknesses or widths of various components may be exaggerated for understanding in the drawings, the present invention is not limited thereto.

Herein, spatially relative terms, such as "upper" and "lower," are defined with reference to the accompanying drawings. Thus, it is to be understood that the term "upper surface," for example may be used interchangeably with the term "lower surface."

Herein, "in-plane retardation Re," "out-of-plane retardation Rth," and "degree of biaxiality NZ" are represented by Equations A, B, and C, respectively:

$$Re = (nx - ny) \times d, \quad (A);$$

$$Rth = ((nx + ny)/2 - nz) \times d, \quad (B); \text{ and}$$

$$NZ = (nx - nz)/(nx - ny), \quad (C),$$

where nx, ny, and nz are indexes of refraction of a corresponding optical device in the slow axis direction, the fast axis direction, and the thickness direction of the optical device at a measurement wavelength, respectively, and d is the thickness of the optical device (unit: nm). In Equations A to C, the measurement wavelength may be 450 nm, 550 nm, or 650 nm.

Herein, "water vapor transmission rate (WVTR)" of an antireflection film, a retardation film, or a base layer refers to a value measured at 23° C. and 99% RH (relative humidity) to 100% RH. The water vapor transmission rate may be measured using a water vapor transmission rate tester (PERMATRAN-W, MODEL 700). For measurement of the water vapor transmission rate, a specimen may be prepared by cutting the antireflection film, the retardation film, or the base layer to a size of 10 cm×10 cm (length× width).

Herein, "index of refraction" refers to a value measured at a wavelength of 550 nm using a refractometer. Herein, "light transmittance" and "degree of polarization" refer to values measured using a spectrophotometer at a wavelength of 550 nm.

Herein, "reflectivity" refers to a value measured on a specimen, which was prepared by laminating a black acryl sheet on a base layer of an antireflection film via an acrylic adhesive, using a reflectometer in an SCI reflection mode (light source: C light source, light source aperture: φ4 mm, measurement viewing angle: 2°) at a wavelength of 550 nm. The reflectometer may be a spectrophotometer CM-2600d (Konica Minolta), without being limited thereto.

Herein, "short wavelength dispersion" refers to Re(450)/Re(550), and "long wavelength dispersion" refers to Re(650)/Re(550). Re(450), Re(550), and Re(650) refer to in-plane retardation (Re) of a single retardation layer or a laminate of retardation layers at wavelengths of about 450 nm, 550 nm, and 650 nm, respectively.

As used herein to represent an angle, "+" means a counterclockwise direction about a reference point, and "−" means a clockwise direction about the reference point.

Herein, reflective color values a* and b* of an antireflection film or a polarizing plate refer to color values a* and b* in the CIE coordinate system, respectively. The reflective color values a* and b* may be obtained from the CIE coordinate system in which the x-axis indicating a values is orthogonal to the y-axis indicating b values. The a value becomes red with increasing absolute value in a positive direction and becomes green with increasing absolute value in a negative direction, and the b value becomes yellow with increasing absolute value in the positive direction and becomes blue with increasing absolute value in the negative direction. The reflective color values "a*" and "b*" were evaluated according to the CIE L*a*b* color coordinate standards.

The reflective color values a* and b* of the antireflection film may be measured on a specimen prepared in the same manner as in measurement of reflectivity using a CM-2600d (Konica Minolta) spectrophotometer in an SCI reflection mode (light source: C light source, light source aperture: φ4 mm, measurement viewing angle: 2°). The reflective color values a* and b* of the polarizing plate may be measured on the polarizing plate stacked on a panel (for example, OLED TV panel) using a CM-2600d (Konica Minolta) spectrophotometer in an SCI reflection mode (light source: C light source, light source aperture: φ4 mm, measurement viewing angle: 2°) by emitting light towards the polarizing plate, with the panel in an open state.

The reflectivity and the reflected color values may be measured by two measurement methods. One measurement method is a specular component included (SCI) manner in which reflected light including a front reflected light component is measured, and the other measurement method is a specular component excluded (SCE) manner in which reflected light excluding the front reflected light component is measured. Herein, the reflected color values of the antireflection film are measured in the SCI manner and the reflected color values of the polarizing plate assembled to an OLED panel are measured in the SCE manner. In general, since humans ignore light reflected from a front side and perceive reflected colors, the SCE manner is mainly used in measurement of the reflected colors as in the case in which humans perceive the colors.

Herein, the term "(meth)acryl" refers to acryl and/or methacryl.

As used herein to represent a specific numerical range, the expression "X to Y" means "greater than or equal to X and less than or equal to Y (X≥ and ≥Y)."

The inventors of the present invention invented a polarizing plate that includes a retardation film exhibiting positive wavelength dispersion, can improve reflected color sensitivity when applied to a panel, for example, an OLED panel, and exhibits good reliability when left at high temperature and under high temperature/humidity conditions.

When stacked on an OLED panel, the polarizing plate according to the present invention can realize a reflectivity of 1.5% or less, for example, 0% to 1.5%, a reflected color value a* of less than 20, and a reflective color value b* of greater than −25, as measured at a wavelength of 550 nm. Within this range, the polarizing plate according to the present invention can secure good screen quality (black visibility) by securing good reflected color sensitivity, when applied to the OLED panel. The black visibility is that the screen of the display apparatus looks black. Accordingly, the polarizing plate according to the present invention may be used as a polarizing plate for antireflection in a light emitting diode display apparatus, for example, an organic light emitting diode display apparatus. Embodiments of the present invention reduce polarization variation rate at high temperature or under high temperature/humidity conditions while securing specific reflected color values a* and b* within the above ranges. In one or more embodiments, the polarizing plate may have a reflected color value a* of 10, 11, 12, 13, 14, 15, 16, 17, 18, or 19 and a reflected color value b* of −24, −23.5, −23, −22.5, −22, −21.5, −21, −20.5, −20, −19.5, −19, −18.5, −18, −17, −16, −15, −14, or −13. For example, the polarizing plate may have a reflected color value a* of 12 to 19 and a reflected color value b* of −24 to −16.

In one or more embodiments, the polarizing plate may have a variation rate of a degree of polarization of −0.4% to 0%, as calculated by the following Equation 1, and a variation rate of a degree of polarization of −0.1% to 0%, as calculated by the following Equation 2. Within this range, the polarizing plate can secure good reliability of an optical display apparatus including the same.

$$\text{Variation rate of a degree of polarization} = [(A-B)/B] \times 100, \qquad 1,$$

where B is an initial degree of polarization of the polarizing plate (unit: %), and A is a degree of polarization of the polarizing plate, as measured after the polarizing plate is left at 85° C. for 1,000 hours (unit: %).

$$\text{Variation rate of a degree of polarization} = [(C-B)/B] \times 100, \qquad 2,$$

where B is an initial degree of polarization of the polarizing plate (unit: %) and, C is a degree of polarization of the polarizing plate, as measured after the polarizing plate is left at 60° C. and 95% RH for 1,000 hours (unit: %).

In addition, the polarizing plate according to one or more embodiments of the present invention has low reflectivity at a front side thereof to improve black visibility at the front side even without a patterned layer on a lower surface of a polarizer.

The polarizing plate according to one or more embodiments of the present invention includes a polarizer, an antireflection film stacked on a first surface of the polarizer, and a retardation film stacked on a second surface of the polarizer, wherein the antireflection film has a water vapor transmission rate of 1 g/m²·day to 30 g/m² day, and the retardation film has a water vapor transmission rate of 1 g/m²·day to 100 g/m²·day.

Next, a polarizing plate according to an embodiment of the present invention will be described with reference to FIG. 1.

Figure 1:
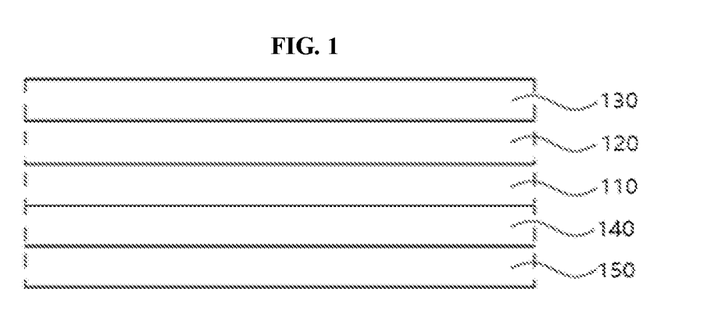
FIG. 1 is a cross-sectional view of a polarizing plate according to an embodiment of the present invention.

Referring to FIG. 1, a polarizing plate according to an embodiment includes a polarizer 110, a first bonding layer 120, an antireflection film 130, a second bonding layer 140, and a retardation film 150. The first bonding layer 120 and the antireflection film 130 may be sequentially stacked on an upper surface of the polarizer 110, and the second bonding layer 140 and the retardation film 150 may be sequentially stacked on a lower surface of the polarizer 110.

Polarizer

The polarizer 110 may provide an antireflection function by converting natural light or polarized light into polarized light through linear polarization in a certain direction.

In an embodiment, the polarizer 110 may have a light transmittance of about 40% or more, for example, about 40% to about 45%, and a degree of polarization of about 99% or more, for example, about 99% to about 100%, at a wavelength of 550 nm. Within this range, the polarizer can improve antireflection performance of the polarizing plate through combination with the retardation layer.

In an embodiment, the polarizer 110 may have a thickness of about 2 μm to about 30 μm, and, in an embodiment, about 4 μm to about 25 μm. Within this range, the polarizer can be used in the polarizing plate.

In an embodiment, the polarizer 110 may be fabricated from a polymer film mainly consisting of a polyvinyl alcohol resin. In an embodiment, the polarizer 110 may be fabricated by dyeing the polymer film with iodine or dichroic dyes, followed by uniaxially stretching the film in a machine direction (MD). In an embodiment, the polarizer may be fabricated through washing, swelling, dyeing, stretching, and crosslinking. In addition, a coloring process may be further performed. Washing, swelling, dyeing, stretching, crosslinking, and coloring may be performed by typical methods well known to those skilled in the art.

Since, in an embodiment, the polarizer 110 is fabricated by uniaxially stretching a polymer film in the MD, the polarizer may have an absorption axis in the stretched direction. In an embodiment, with reference to the MD of the polarizing plate, the polarizer may have an absorption axis tilted at an angle of −1° to +1°, and, in an embodiment, 0°. The "MD of the polarizing plate" is a direction in which the polarizer is moved upon fabrication of the polarizing plate in a roll-to-roll method and is defined as substantially the same direction as the MD of the polarizer.

In an embodiment, the polarizer may be fabricated by uniaxially stretching a polymer film at a total elongation of about 5 times to about 7 times, and, in an embodiment, about 5.5 times to about 6.5 times, and, in an embodiment, about 6.0 times in the MD. With this total elongation, the polarizer can be fabricated to have a high degree of polarization. Since the polarizer is fabricated through stretching to this total elongation, the polarizing plate can suffer from significant deterioration in degree of polarization due to shrinkage when left at high temperature and/or under high temperature/humidity conditions for a long period of time. Embodiments of the present invention improve reliability of the polarizing plate by solving the problem of deterioration in degree of polarization.

Antireflection Film

The antireflection film 130 may be stacked on an upper surface of the polarizer 110 to protect the polarizer 110.

In an embodiment, the antireflection film 130 may have a water vapor transmission rate of 1 g/m²·day to 30 g/m²·day. Within this range, the antireflection film 130 can realize the polarization variation rates of Equations 1 and 2 when used together with a retardation film having a water vapor transmission rate described below. In an embodiment, the antireflection film 130 may have a water vapor transmission rate of 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 g/m²·day, for example, 15 g/m²·day to 25 g/m² day. Within this range, the antireflection film allows easy adjustment in water vapor transmission rate and reflectivity.

The antireflection film may include a base layer, a hard coating layer stacked on an upper surface of the base layer, and a low reflectivity layer stacked on an upper surface of the hard coating layer.

The low reflectivity layer has a lower index of refraction than the base layer or the hard coating layer or a high refractivity layer interposed between the base layer and the low reflectivity layer to reduce reflectivity of the antireflection film. In an embodiment, the antireflection film may have a reflectivity of 1% or less, and, in an embodiment, 0%, 0.1%, 0.2%, 0.3%, 0.4%, 0.5%, 0.6%, 0.7% 0.8%, 0.9%, or 1%, for example, 0% to 0.5%. Within this range, the low reflectivity layer can improve reflected color sensitivity.

In an embodiment, the antireflection film may have a minimum reflected wavelength of 460 nm or more, and, in an embodiment, 460 nm, 465 nm, 470 nm, 475 nm, 480 nm, 485 nm, 490 nm, 495 nm, 500 nm, 505 nm, 510 nm, 515 nm, 520 nm, 525 nm, 530 nm, 535 nm, or 540 nm, for example, 480 nm to 540 nm. Within this range, the antireflection film is effective in improvement in sensitivity to reflected color when combined with the retardation film described below. Here, "minimum reflected wavelength" refers to a wavelength at which the antireflection film exhibits the lowest reflectivity in measurement of reflectivity at various wavelengths.

In an embodiment, the low reflectivity layer may have a thickness of 110 nm to 180 nm, and, in an embodiment, 110 nm, 115 nm, 120 nm, 125 nm, 130 nm, 135 nm, 140 nm, 145 nm, 150 nm, 155 nm, 160 nm, 165 nm, 170 nm, 175 nm, or 180 nm, for example, 110 nm to 160 nm. Within this range, the low reflectivity layer allows easy achievement of the water vapor transmission rate and the color values a* and b*within the above ranges.

In an embodiment, the low reflectivity layer may have an index of refraction of 1.10 to 1.60, and, in an embodiment, 1.10, 1.20, 1.30, 1.40, 1.50, or 1.60, for example, 1.20 to 1.50. Within this range, the low reflectivity layer can reduce reflectivity of the antireflection film while allowing easy achievement of the color values a* and b* described below.

The low reflectivity layer may include at least one selected from among low refractivity inorganic particles; low refractivity organic particles; and a monomer, an oligomer thereof or a polymer thereof having a low index of refraction after being cured. These can facilitate improvement in reflected color sensitivity through reduction in index of refraction of the low reflectivity layer.

In an embodiment, the low refractivity inorganic particles may have an index of refraction of 1.10 to 1.60, and, in an embodiment, 1.25 to 1.45, and may include, for example, hollow silica particles. In an embodiment, the low refractivity organic particles may have an index of refraction of 1.10 to 1.60, and, in an embodiment, 1.25 to 1.45, and may include organic particles subjected to surface treatment with fluorine and/or particles polymerized with a fluorine-containing monomer. In an embodiment, the monomer, the oligomer, or the polymer thereof having a low index of refraction after being cured may have an index of refraction of 1.10 to 1.60, and, in an embodiment, 1.25 to 1.45, after being cured, and may include a fluorine-containing curable monomer, an oligomer thereof, or a polymer thereof.

Each of the low refractivity inorganic particles and the low refractivity organic particles may have a smaller average particle diameter (D50) than the thickness of the low reflectivity layer, and, in an embodiment, an average particle diameter (D50) of 20 nm to 100 nm, and, in an embodiment, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm, for example, 40 nm to 100 nm. Within this range, the low refractivity inorganic particles and the low refractivity organic particles can be contained in the low reflectivity layer while decreasing surface roughness of the low reflectivity layer.

In the low reflectivity layer, the at least one selected from among the low refractivity inorganic particles; the low refractivity organic particles; and the monomer, the oligomer thereof or the polymer thereof having a low index of refraction after being cured may be present in an amount of 0.2 wt % to 2.0 wt %, and, in an embodiment, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, or 2.0 wt %, for example, 0.5 wt % to 1.5 wt %. Within this range, the low reflectivity layer can have a low index of refraction, thereby reducing reflectivity of the antireflection film.

The at least one selected from among the low refractivity inorganic particles; the low refractivity organic particles; and the monomer, the oligomer thereof or the polymer thereof having a low index of refraction after being cured may be embedded in a matrix of the low reflectivity layer to be dispersed therein. The matrix may be formed of a composition that can reduce haze of the antireflection film by allowing at least one selected from among the low refractivity inorganic particles; the low refractivity organic particles; and the monomer, the oligomer thereof or the polymer thereof having a low index of refraction after being cured to be sufficiently dispersed therein.

The composition for the matrix may include a photocurable monomer, for example, a (meth)acrylate monomer and/or a vinyl monomer. In an embodiment, the (meth)acrylate monomer may have 1 to 10, and, in an embodiment, 1 to 6, (meth)acrylate groups. For example, the (meth)acrylate monomer may include a mono-to deca-functional (meth)acrylate derived from a monool or a polyol having a $C_1$ to $C_{10}$ alkyl group or a $C_1$ to $C_{10}$ alkylene group. In an embodiment, the (meth)acrylate monomer may include at least one selected from among hexanediol di(meth)acrylate, trim ethylolpropane tri(meth)acrylate, pentaerythritol tetra (meth)acrylate, dipentaerythritol penta(meth)acrylate, dipentaerythritol, and hexa(meth) acrylate, without being limited thereto.

The low reflectivity layer may be formed of a composition for the low reflectivity layer, which includes at least one selected from among the low refractivity inorganic particles; the low refractivity organic particles; and the monomer, the oligomer thereof or the polymer thereof having a low index of refraction after being cured, and the composition for the matrix. The composition for the low reflectivity layer may further include at least one selected from among a photoinitiator and a thermal initiator for curing the composition, and various additives, such as a surfactant, a dispersant, an antioxidant, a thermal stabilizer, and the like. A method for forming the low reflectivity layer will be described below.

The base layer may be stacked on a lower surface of the low reflectivity layer to support the low reflectivity layer.

The base layer may include a coating layer or film formed of an optically transparent resin or a composition including the same. In an embodiment, the base layer may include at least one selected from among polyester resins, such as polyethylene terephthalate, polyethylene naphthalate, polybutylene terephthalate, and polybutylene naphthalate, and cyclic olefin polymer resins.

In an embodiment, the base layer includes at least one selected from among a polyester resin and a cyclic olefin polymer resin, and, in an embodiment, a polyester resin, and, in an embodiment, polybutylene terephthalate. These compounds may assist in reduction of the water vapor transmission rate of the antireflection film while achieving a* and b* values of the antireflection film.

In an embodiment, the base layer may have a water vapor transmission rate of 1 $g/m^2 \cdot day$ to 30 $g/m^2 \cdot day$, and, in an embodiment, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 g/m²·day.

Within this range, the base layer can facilitate reduction of the water vapor transmission rate of the antireflection film.

In an embodiment, the base layer may have an in-plane retardation of 20,000 nm or less, for example, 0 nm to 20,000 nm, and, in an embodiment, 5,000 nm to 15,000 nm, at a wavelength of 550 nm. Within this range, the based layer can prevent or substantially prevent deterioration in screen quality due to the index of refraction of the base layer or the resin contained in the base layer.

When the base layer is stretched to have a specific in-plane retardation, the base layer may have a slow axis in an in-plane direction and the slow axis of the base layer may be tilted at an angle of +80° to +100°, and, in an embodiment, +80°, +81°, +82°, +83°, +84°, +85°, +86°, +87°, +88°, +89°, +90°, +91°+92°, +93°, +94°, +95°, +96°, +97°, +98°, +99° or +100°, for example, +83° to +97°, and, in an embodiment, +90°, with reference to the MD of the polarizing plate. Within this range, the base layer can suppress generation of rainbow spots while securing improvement in reflected colors.

In an embodiment, the base layer may have a thickness of about 30 μm to about 150 μm, and, in an embodiment, about 60 μm to about 100 μm. Within this range, the base layer can be used in the antireflection film.

The antireflection film may include a hard coating layer and/or a high refractivity layer between the base layer and the low reflectivity layer.

The hard coating layer may improve hardness of the antireflection film, thereby improving impact resistance when the polarizing plate is applied to an outermost side of an optical display apparatus.

The index of refraction of the hard coating layer may be suitably set so as to be greater than the index of refraction of the low reflectivity layer. In an embodiment, the hard coating layer may have an index of refraction of 1.4 to 1.6, and, in an embodiment, 1.45 to 1.55. Within this range, the hard coating layer can assist in reduction in reflectivity of the antireflection film.

The hard coating layer may be formed of a typical photocurable composition and/or a typical thermosetting composition well-known to those skilled in the art. For example, the hard coating layer may be a (meth)acrylate, urethane (meth)acrylate, or epoxy (meth)acrylate-based coating layer. The hard coating layer may further include inorganic particles and/or organic particles to improve hardness of the antireflection film. In an embodiment, the organic particles may be acrylic or styrene particles, and the inorganic particles may be at least one selected from among silica, zirconia, titania, zinc oxide, and tin oxide particles, without being limited thereto.

In an embodiment, the hard coating layer may have a thickness of about 5 μm to about 10 μm, and, in an embodiment, about 6 μm to about 9 μm. Within this range, the hard coating layer can be included in the antireflection film.

The high refractivity layer can further improve reflected color sensitivity of the polarizing plate by further reducing reflectivity of the antireflection film.

The index of refraction of the high refractivity layer may be suitably set so as to be greater than the index of refraction of the low reflectivity layer. In an embodiment, the high refractivity layer may have an index of refraction of about 1.0 to about 3.0, and, in an embodiment, about 1.5 to about 2.8. Within this range, the high refractivity layer can facilitate reduction in reflectivity of the antireflection film.

The high refractivity layer may be formed of any suitable composition so long as the composition can secure the above index of refraction. In an embodiment, the high refractivity layer may be formed of a composition including an aromatic group-containing photocurable or thermosetting monomer, an oligomer thereof, or a resin thereof. The composition may further include high refractivity particles, for example, at least one selected from among silica, zirconia, and titania particles having an index of refraction of about 1.5 to about 2.8.

In an embodiment, the high refractivity layer may have a thickness of 10 nm to 300 nm, and, in an embodiment, 30 nm to 200 nm. Within this range, the high refractivity layer can be included in the antireflection film.

In an embodiment, he antireflection film 130 may have a thickness of about 50 μm to about 100 μm, and, in an embodiment, about 60 μm to about 90 μm. Within this range, the antireflection film can be included in the polarizing plate.

In an embodiment, the antireflection film 130 may be fabricated by depositing the composition for the low reflectivity layer to a thickness (e.g., a predetermined thickness) on a non-stretched film for the base layer, followed by curing the composition to form the low reflectivity layer on the non-stretched film. In another embodiment, the antireflection film 130 may be fabricated by coating the composition for the low reflectivity layer to a thickness (e.g., a predetermined thickness) on a non-stretched film for the base layer, curing the composition to form a coating for the low reflectivity layer on the non-stretched film, and stretching the entirety of the non-stretched film and the coating for the low reflectivity layer, followed by heat treatment. In another embodiment, the antireflection film 130 may be fabricated by stretching a non-stretched film for the base layer to form a base layer and coating the composition for the low reflectivity layer to a thickness (e.g., a predetermined thickness) on the base layer, followed by curing the composition. In an embodiment, the antireflection film 130 is fabricated by forming a coating for the low reflectivity layer on a non-stretched film and stretching the entirety of the non-stretched film and the coating for the low reflectivity layer, followed by heat treatment.

A coating for the low reflectivity layer may be formed by coating the composition for the low reflectivity layer on an upper surface of the hard coating layer, followed by curing. In an embodiment, by uniaxially stretching a laminate of the fabricated non-stretched film, the coating for the hard coating layer, and the coating for the low reflectivity layer in the MD of the non-stretched film, followed by heat treatment of the laminate, the antireflection film 130 may have a light transmittance of about 90% or more, and, in an embodiment, 90%, 91%, 92%, 93%, 94%, 95%, 96%, 97%, 98%, 99%, 100%, for example, 90% to 97%, at a wavelength of 550 nm. Within this range, the antireflection film 130 can facilitate improvement in screen quality when applied to the outermost side of the polarizing plate.

In an embodiment, the antireflection film 130 may have a positive (+) reflected color value a* of 4 to 10, and, in an embodiment, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, 8, 8.2, 8.4, 8.6, 8.8, 9, 9.2, 9.4, 9.6, 9.8, or 10, for example, 5 to 10, and, in an embodiment, 5 to 8, and a negative (−) reflected color value b* of −20 to −1, and, in an embodiment, −20, −19, −18, −17, −16, −15, −14, −13, −12, −11, −10, −9, −8, −7, −6, −5, −4, −3, −2, −1, for example, −15 to −1, and, in an embodiment, −12 to −1. Within this range, the antireflection film 130 can improve reflected color sensitivity when the polarizing plate including the retardation film exhibiting positive wavelength dispersion on the lower surface of the polarizer is applied to an optical display apparatus. Each of the reflected color values a* and b* of the antireflection film 130 is selected to improve reflected color sensitivity of the polarizing plate, which includes the retardation film exhibiting positive wavelength dispersion on the lower surface of the polarizer.

As described below, positive wavelength dispersion means that short wavelength dispersion (Re(450)/Re(550)) is higher than long wavelength dispersion(Re(650)/Re(550)). Negative wavelength dispersion is generally realized by a liquid crystal layer, thereby causing increase in manufacturing costs. The positive wavelength dispersion advantageously solves the problem of the negative wavelength dispersion. Herein, "negative dispersion" means that short wavelength dispersion is lower than long wavelength dispersion.

The reflected color values a* and b* may be realized by the antireflection film described above. The inventors of the present invention confirmed that the antireflection film including the low reflectivity layer could realize the color values a* and b* while achieving the water vapor transmission rate by controlling the thickness of the low reflectivity layer. Here, for the antireflection film including the base layer and the low reflectivity layer, the water vapor transmission rate of the antireflection film decreases with decreasing water vapor transmission rate of the base layer, thereby facilitating fabrication of the antireflection film. The reflected color values a* and b* may be achieved by controlling the thickness of the low reflectivity layer in the antireflection film.

In an embodiment, the antireflection film 130 may have a degree of biaxiality of 1.2 or more, and, in an embodiment, 1.2, 1.25, 1.3, 1.35, 1.4, 1.45, 1.5, 1.55, 1.6, 1.65, 1.7, 1.75, 1.8, 1.85, 1.9, 1.95, or 2.0, for example, 1.5 to 2.0, and, in an embodiment, 1.5 to 1.8, at a wavelength of 550 nm. Within this range, the antireflection film can suppress generation of rainbow spots.

In an embodiment, the antireflection film 130 may have an in-plane retardation of 3,000 nm or more, and, in an embodiment, 3,000 nm, 4,000 nm, 5,000 nm, 6,000 nm, 7,000 nm, 8,000 nm, 9,000 nm, 10,000 nm, 11,000 nm, 12,000 nm, 13,000 nm, 14,000 nm, 15,000 nm, 16,000 nm, 17,000 nm, 18,000 nm, 19,000 nm, or 20,000 nm, for example, 5,000 nm to 20,000 nm, and, in an embodiment, 5,000 nm to 18,000 nm, at a wavelength of 550 nm. Within this range, the antireflection film can suppress generation of rainbow spots.

Retardation Film

The retardation film 150 may be stacked on a lower surface of the polarizer 110 to improve reflected color sensitivity of the polarizing plate.

In an embodiment, the retardation film 150 may have a water vapor transmission rate of 1 g/m²·day to 100 g/m²·day. Within this range, the retardation film can realize the polarization variation rates of Equations 1 and 2 when used together with the antireflection film having the water vapor transmission rate within the above range. In an embodiment, the retardation film 150 may have a water vapor transmission rate of 1, 2, 3, 4, 5, 6, 7, 8, 9, 10, 20, 30, 40, 50, 60, 70, 80, 90, or 100 g/m²·day, for example, 1 g/m²·day to 50 g/m²·day, and, in an embodiment, 1 g/m²·day to 10 g/m²·day.

The water vapor transmission rate of the retardation film may be adjusted depending upon a resin for the retardation film and/or a process for fabricating the retardation film using a composition for the retardation film. The composition for the retardation film may further include an additive for reducing the water vapor transmission rate to further reduce the water vapor transmission rate.

The retardation film 150 may be a film exhibiting positive wavelength dispersion. Here, "positive wavelength dispersion" means that the short wavelength dispersion (Re(450)/Re(550)) is higher than the long wavelength dispersion (Re(650)/Re(550)). Embodiments of the present invention improve reflected color sensitivity by stacking the antireflection film having the above reflected color values a* and b* on the retardation film 150 exhibiting positive wavelength dispersion in the polarizing plate applied to the panel. The positive wavelength dispersion may be adjusted by the process of fabricating the retardation film.

In an embodiment, the retardation film 150 may have a short wavelength dispersion of 0.99 to 1.05, and, in an embodiment, 0.99, 1.00, 1.01, 1.02, 1.03, 1.04, or 1.05, for example, greater than 1 to 1.02, and a long wavelength dispersion of 0.98 to 1.04, and, in an embodiment, 0.98, 0.99, 1.00, 1.01, 1.02, 1.03, or 1.04, for example, 0.99 to 1.01.

The retardation film 150 may include a film formed of an optically transparent resin or a composition including the same capable of realizing the water vapor transmission rate and the positive wavelength dispersion.

In an embodiment, the retardation film is a non-liquid crystal layer and may be formed of at least one resin selected from among polyester resins including polyethylene terephthalate, polybutylene terephthalate (PET), polyethylene naphthalate, polybutylene naphthalate, and the like, cyclic polyolefin (COP) resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, the resin is a cyclic olefin polymer resin.

The retardation film may have positive (+) birefringence. Here, "positive (+) birefringence" means that a transparent film having birefringence characteristics imparted by stretching exhibits an increase in index of refraction in a stretched direction. The positive (+) birefringence facilitates fabrication of the retardation film, thereby improving productivity of the polarizing plate.

In an embodiment, the retardation film 150 may have an in-plane retardation of 130 nm to 160 nm, and, in an embodiment, 130 nm, 135 nm, 140 nm, 145 nm, 150 nm, 155 nm, or 160 nm, for example, 140 nm to 150 nm, at a wavelength of 550 nm. Within this range, the retardation film can facilitate improvement in antireflection performance of the polarizing plate.

In an embodiment, the retardation film 150 may have a degree of biaxiality of 0.9 to 1.4, and, in an embodiment, 0.9, 1.0, 1.1, 1.2, 1.3, or 1.4, for example, 1.0 to 1.3, at a wavelength of 550 nm. Within this range, the retardation film can reduce reflectivity on an inclined surface.

In an embodiment, the retardation film 150 may be a single sheet (monolayer) type retardation film and may have a thickness of about 30 μm to about 60 μm, and, in an embodiment, about 40 μm to about 50 μm. Within this range, the retardation film 150 can be applied to the polarizing plate and can easily achieve the above in-plane retardation.

The retardation film 150 may be fabricated by stretching a non-stretched film prepared by extrusion of the aforementioned resin or a composition including the same. In an embodiment, the retardation film may be fabricated through MD-uniaxial stretching, TD-uniaxial stretching, MD and TD biaxial stretching or oblique stretching of the non-stretched film to a certain elongation (e.g., a predetermined elongation). Stretching may be performed by a typical method known to those skilled in the art.

The retardation film 150 may be fabricated by stretching to have a slow axis in the in-plane direction. In an embodiment, with reference to the MD of the polarizing plate, the retardation film has a slow axis tilted at −137° to −133°, and, in an embodiment, −137°, −136°, −135°, −134°, or −133°, for example, −136° to −134°, and, in an embodiment, −135°, or −47° to −43°, and, in an embodiment, −47°, −46°, −45°, −44°, −43°, for example, −46° to −44°, and, in an embodiment, −45°. Within this range, the retardation film can improve reflected colors.

Although not shown in FIG. 1, the polarizing plate may further include an adhesive layer on a lower surface of the retardation film 150. The adhesive layer may serve to adhesively attach the polarizing plate to a display panel. The adhesive layer may be formed of a typical adhesive composition well known to those skilled in the art, for example, a (meth)acrylic, silicone or epoxy-based adhesive composition, without being limited thereto.

First Bonding Layer

The first bonding layer 120 may be interposed between the polarizer 110 and the antireflection film 130 to bond the polarizer 110 to the antireflection film 130.

In an embodiment, the first bonding layer 120 is formed of an actinic radiation-curable adhesive composition. In an embodiment, the actinic radiation-curable adhesive composition may include an epoxy compound, a (meth)acrylic compound, and a photoinitiator. The epoxy compound may include at least one selected from among an alicyclic epoxy compound, an aromatic epoxy compound, an aliphatic epoxy compound, and a hydrogenated aromatic epoxy compound, which are well known to those skilled in the art. The (meth)acrylic compound contains at least one (meth)acrylate group and may be selected from typical (meth)acrylic compounds well known to those skilled in the art. The photoinitiator may include at least one selected from among a photo-cationic polymerization initiator and a photoradical polymerization initiator, which are well known to those skilled in the art.

In an embodiment, the first bonding layer 120 may have a thickness of 0.5 μm to 2.5 μm, and, in an embodiment, 1 μm to 2 μm. Within this range, the first bonding layer can secure sufficient bonding strength between the polarizer and the antireflection film and can be used in the polarizing plate.

Second Bonding Layer

The second bonding layer 140 may be interposed between the polarizer 110 and the retardation film 150 to bond the polarizer 110 to the retardation film 150.

In an embodiment, the second bonding layer 150 is formed of an actinic radiation-curable adhesive composition without being limited thereto. Details of the actinic radiation-curable adhesive composition may be substantially the same as those of the first bonding layer.

In an embodiment, the second bonding layer 140 may have a thickness of 0.5 μm to 2.5 μm, and, in an embodiment, 1 μm to 2 μm. Within this range, the second bonding layer can achieve sufficient bonding strength between the polarizer and the antireflection film and can be used in the polarizing plate.

In an embodiment, the polarizing plate may have a degree of polarization of 99.5% or more, for example, 99.9% or more, and a light transmittance of 45% or more, for example, 45% to 50%, at a wavelength of 550 nm.

An optical display apparatus according to one or more embodiments of the present invention may include the polarizing plate according to an embodiment of the present invention. For example, the optical display apparatus may include any of organic light emitting diode (OLED) displays and liquid crystal displays.

In an embodiment, the OLED display apparatus may include: an OLED panel including a flexible substrate; and a polarizing plate according to an embodiment of the present invention stacked on the OLED panel.

In another embodiment, the OLED display apparatus may include: an OLED panel including a non-flexible substrate; and a polarizing plate according to an embodiment of the present invention stacked on the OLED panel.

Next, the present invention will be described in further detail with reference to some examples. However, it should be noted that these examples are provided for purposes of illustration and should not be construed in any way as limiting the present invention.

Example 1

Fabrication of Polarizer

A polyvinyl alcohol film (PS #60, pre-stretching thickness: 45 μm, Kuraray Co., Ltd., Japan) washed with water was subjected to swelling with water at 30° C. in a swelling bath.

Thereafter, the polyvinyl alcohol film was left in a dyeing bath filled with an aqueous solution containing 3 wt % of potassium iodide at 30° C. for 200 seconds. Then, the polyvinyl alcohol film was passed through a wet crosslinking bath filled with an aqueous solution containing 3 wt % of boric acid at 30° C. Next, the polyvinyl alcohol film was stretched to a total elongation of 6 times an initial length thereof in a wet stretching bath filled with an aqueous solution containing 3 wt % of boric acid and 3 wt % of potassium iodide at 50° C.

Next, the polyvinyl alcohol film was immersed in a color correction bath containing 3 wt % of boric acid and 3 wt % of potassium iodide at 20° C. for 100 seconds, followed by washing and drying, thereby preparing a polarizer (thickness: 17 μm).

Fabrication of Antireflection Film

A non-stretched film was fabricated through melt-extrusion of a composition comprising a polyethylene terephthalate (PET) resin. A coating for a hard coating layer was formed by depositing a composition comprising an acrylate resin on an upper surface of the non-stretched film, followed by curing the composition. Next, a coating for a low reflectivity layer was formed by depositing a composition containing hollow silica particles on an upper surface of the hard coating layer, followed by curing. An antireflection film 1 was fabricated by uniaxially stretching a laminate of the non-stretched film, the coating for the hard coating layer and the coating for the low reflectivity layer in the MD of the non-stretched film, followed by heat treatment of the laminate. Further detailed specifications of the antireflection film 1 are shown in Table 1.

Fabrication of Retardation Film

A non-stretched film was fabricated through melt-extrusion of a composition comprising a cyclic olefin polymer (COP) resin. A retardation film was fabricated by stretching the non-stretched film in an oblique direction with respect to the MD.

Fabrication of Polarizing Plate

An adhesive composition comprising 60 parts by weight of a bifunctional alicyclic epoxy compound (CELLOXIDE 2021P, Daicel), 40 parts by weight of a (meth)acrylate compound (tricyclodecane dimethanol diacrylate, M-262, Miwon SC), 2 parts by weight of diphenyl-4-(phenylthio) phenyl sulfonium hexafluorophosphate, and 1 part by weight of 1-hydroxy-cyclohexylphenylketone was prepared.

Next, with the prepared composition deposited to a predetermined thickness on each of upper and lower surfaces of the polarizer, the antireflection film 1 was bonded to the upper surface of the polarizer, and the retardation film was bonded to the lower surface of the polarizer, followed by curing the composition under a metal halide lamp at 400 mW/cm$^2$ and at 1000 mJ/cm$^2$, thereby fabricating a polarizing plate in which the antireflection film 1, the first bonding layer (thickness: 1.5 μm), the polarizer, the second bonding layer (thickness: 1.5 μm), and the retardation film are sequentially stacked in the stated order. With reference to the MD of the polarizing plate, the polarizer had an absorption axis tilted at 0°, the base layer of the antireflection film had a slow axis tilted at +90°, and the retardation film had a slow axis tilted at −45°.

Example 2

A polarizing plate was fabricated in the same manner as in Example 1 except that the transmittance of the polarizer was higher than Example 1 as 0.8% as by lowering the concentration of iodine in the dyeing bath.

Examples 3 and 4

Polarizing plates were fabricated in the same manner as in Example 1 except that the antireflection film was changed as listed in Table 3.

Comparative Example 1

A polarizing plate was fabricated in the same manner as in Example 1 except that the antireflection film was changed as listed in Table 3.

TABLE 1

| | Reflectivity (%, @550 nm) | Reflected color value a* | Reflected color value b* | Base layer | Thickness of low reflectivity layer (nm) | Water vapor transmission rate (g/m$^2$ · day) |
|---|---|---|---|---|---|---|
| Antireflection film 1 | 0.5 | 5.4 | −8.1 | PET | 130 | 20 |
| Antireflection film 2 | 0.5 | 5.3 | −4.0 | PET | 119 | 20 |
| Antireflection film 3 | 0.5 | 5.4 | −11.5 | PET | 140 | 20 |
| Antireflection film 4 | 1.0 | 3.4 | 2.7 | TAC | 100 | 350 |

Figure 2:
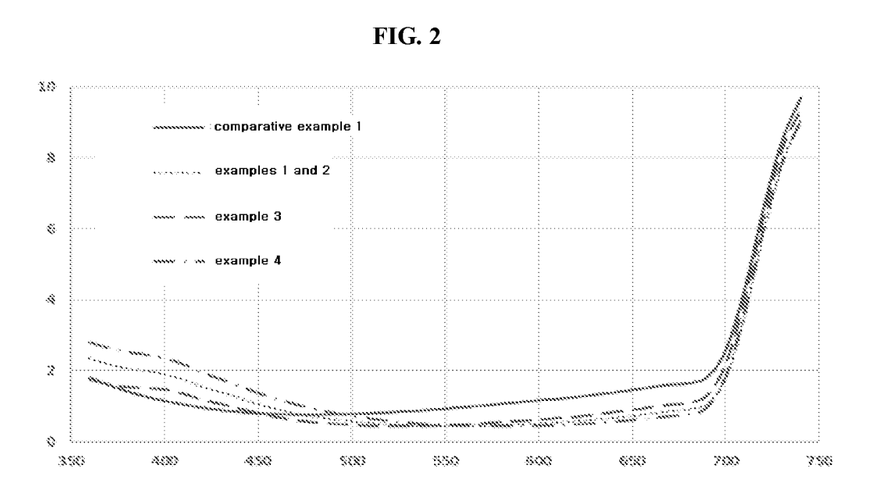
FIG. 2 is a graph depicting reflectivity of antireflection films prepared in some Examples and Comparative Examples, in which the X-axis indicates wavelength (unit: nm) and the Y-axis indicates reflectivity (unit: %).

In Table 1, the antireflection films 2 to 3 were fabricated substantially in the same manner as in Example 1 except for the thickness of the low reflectivity layer. In Table 1, the antireflection film 4 was fabricated substantially in the same manner as in Example 1 except that the thicknesses of the low reflectivity layer and the base layer were changed. FIG. 2 shows reflectivity of the antireflection film at various wavelengths. Referring to FIG. 2, it can be seen that the antireflection films 1 to 3 had a minimum reflection wavelength of 460 nm or more, specifically 480 nm to 540 nm. Conversely, it can be seen that the antireflection film 4 had a minimum reflection wavelength of 450 nm.

TABLE 2

| | Material | Short wavelength dispersion | Long wavelength dispersion | Wavelength dispersion | Water vapor transmission rate (g/m$^2$ · day) | Re (@550 nm) |
|---|---|---|---|---|---|---|
| Retardation film | COP | 1.01 | 1.00 | Positive wavelength dispersion | 3 | 142 |

In-plane retardation and wavelength dispersion of the retardation film were measured using an AxoScan polarimeter (AxoMetric Co., Ltd.).

Figure 3A:
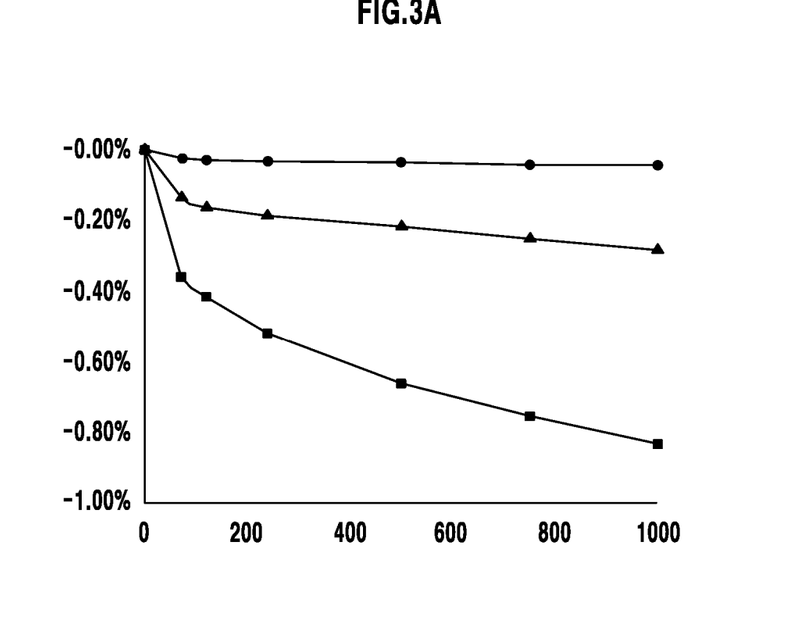
FIGS. 3A and 3B are graphs respectively depicting a variation rate of a degree of polarization of polarizing plates prepared in some Examples and Comparative Examples at high temperature, and a variation rate of a degree of polarization of the polarizing plates under high temperature/humidity conditions, in which the X-axis indicates time (unit: hour), the Y-axis indicates the polarization variation rate (unit: %), ■ represents a Comparative Example 1, ● represents an Example 1, and ▲ represents an Example 2.
Figure 3B:
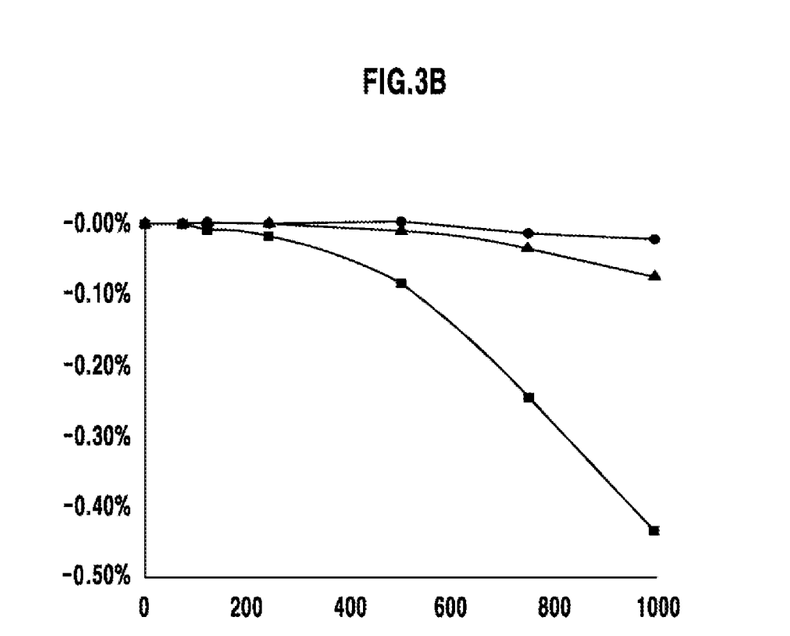

The polarizing plates of the Examples and Comparative Example were evaluated as to the following properties, and results are shown in Table 3 and FIGS. 3A and 3B.

(1) Light transmittance and degree of polarization (unit: %) of polarizing plate: Light transmittance and degree of polarization were measured at a wavelength of 550 nm with respect to the polarizing plates using a UV-Visible Spectrophotometer V730 (JASCO).

(2) Variation rate of degree of polarization (unit:%): Each of the polarizing plates of the Examples and Comparative Example was cut into specimens having a size of 10 cm×10 cm, followed by measuring the degree of polarization by the above method. Thereafter, some specimens were left at 85° C. for 1,000 hours, followed by measuring the degree of polarization to calculate a polarization variation rate according to Equation 1. The other specimens were left at 60° C. and 95% RH for 1,000 hours, followed by measuring the degree of polarization to calculate a polarization variation rate according to Equation 2.

(3) Reflected color values a* and b* of polarizing plate on panel with respect to external light: A module for optical display apparatuses was fabricated by attaching each of the polarizing plates of the Examples and Comparative Example to an upper surface of an organic light emitting diode panel. For the module for optical display apparatuses, light reflected and leaked from the polarizing plate and the organic light emitting diode panel was measured using a CM-2600d (Konica Minolta) spectrophotometer in an SCE reflection mode (light source: C light source, light source aperture: ϕ4 mm, measurement viewing angle: 2°) to obtain color values a* and b* at the front side (0°) in accordance with the CIE 1976 a*b* standard.

high temperature and/or under high temperature/humidity conditions for a long period of time.

Although some embodiments have been described herein, it should be understood that various modifications, changes, alterations, and equivalent embodiments can be made by those skilled in the art without departing from the spirit and scope of the present invention.

What is claimed is:

1. A polarizing plate comprising:
   a polarizer;
   an antireflection film stacked on a first surface of the polarizer; and
   a retardation film stacked on a second surface of the polarizer,
   wherein the antireflection film has a water vapor transmission rate of 15 $g/m^2 \cdot day$ to 30 $g/m^2 \cdot day$, and the retardation film has a water vapor transmission rate of 1 $g/m^2 \cdot day$ to 100 $g/m^2 \cdot day$,
   wherein the antireflection film has a reflectivity of 0% to 0.5% at a wavelength of 550 nm,
   wherein the antireflection film has a minimum reflected wavelength of 480 to 540 nm;
   wherein the antireflection film has a degree of biaxiality of 1.5 to 1.8 at a wavelength of 550 nm; and
   wherein the retardation film has a degree of biaxiality of 1.0 to 1.3 at a wavelength of 550 nm.

2. The polarizing plate according to claim 1, wherein the retardation film exhibits positive wavelength dispersion.

3. The polarizing plate according to claim 1, wherein the retardation film has a short wavelength dispersion of 0.99 to 1.05 and a long wavelength dispersion of 0.98 to 1.04.

4. The polarizing plate according to claim 1, wherein the retardation film has an in-plane retardation of 130 nm to 160 nm at a wavelength of 550 nm.

TABLE 3

|  | Antireflection film | Retardation film | Light transmittance | Degree of polarization | Equation 1 | Equation 2 | Reflected color value a* | Reflected color value b* |
|---|---|---|---|---|---|---|---|---|
| Example 1 | Anfreflecion film 1 | Retardation film | 45.2 | 99.985 | −0.05% | −0.02% | 15.6 | −23.1 |
| Example 2 | Anfreflecion film 1 | Retardation film | 46.0 | 99.587 | −0.27% | −0.08% | 16.2 | −23.3 |
| Example 3 | Anfreflecion film 2 | Retardation film | 45.2 | 99.985 | −0.05% | −0.02% | 13.5 | −19.1 |
| Example 4 | Anfreflecion film 3 | Retardation film | 45.3 | 99.982 | −0.06% | −0.03% | 15.3 | −23.6 |
| Comparative Example 1 | Anfreflecion film 4 | Retardation film | 45.6 | 99.868 | −0.83% | −0.43% | 11.8 | −18.1 |

As shown in Table 3 and FIGS. 3A and 3B, the polarizing plates according to embodiments of the present invention had improved reliability after being left at high temperature and/or under high temperature/humidity conditions for a long period of time. As shown in Table 3, the present invention provides a polarizing plate that includes a retardation film exhibiting positive wavelength dispersion and having low reflectivity and improved reflected color sensitivity when applied to a display panel.

Conversely, the polarizing plate of Comparative Example 1 failed to realize all of the effects of the present invention. As shown in FIGS. 3A and 3B, the polarizing plate of Comparative Example 1 exhibited much poorer reliability than the polarizing plates of the Examples after being left at 5. The polarizing plate according to claim 1, wherein the antireflection film has a positive (+) reflected color value a* of 4 to 10 and a negative (−) reflected color value b* of −20 to −1.

6. The polarizing plate according to claim 1, wherein the antireflection film has an in-plane retardation (Re) of 3,000 nm or more at a wavelength of 550 nm.

7. The polarizing plate according to claim 1, wherein the antireflection film comprises a base layer and a low reflectivity layer stacked on the base layer.

8. The polarizing plate according to claim 7, wherein the low reflectivity layer has a thickness of 110 nm to 180 nm.

9. The polarizing plate according to claim 7, wherein the base layer comprises at least one selected from among a polyester resin and a cyclic olefin polymer resin.

10. The polarizing plate according to claim 7, further comprising at least one selected from among a hard coating layer and a high refractivity layer between the base layer and the low reflectivity layer.

11. The polarizing plate according to claim 1, wherein, with reference to a machine direction (MD) of the polarizing plate, the polarizer has an absorption axis tilted at an angle of −1° to +1°, a base layer included in the antireflection film has a slow axis tilted at an angle of +80° to +100°, and the retardation film has a slow axis tilted at an angle of −137° to −133° or at an angle of −47° to −43°.

12. The polarizing plate according to claim 1, further comprising:
   a first bonding layer between the polarizer and the antireflection film; and
   a second bonding layer between the polarizer and the retardation film,
   each of the first and second bonding layers being formed of an actinic radiation-curable bonding agent.

13. An optical display apparatus comprising the polarizing plate according to claim 1.

\* \* \* \* \*